Feb. 18, 1941.  E. W. DE BISSCHOP  2,232,440
VIEW FINDER ATTACHABLE TO PHOTOGRAPHIC CAMERAS
Filed July 11, 1939  2 Sheets-Sheet 1
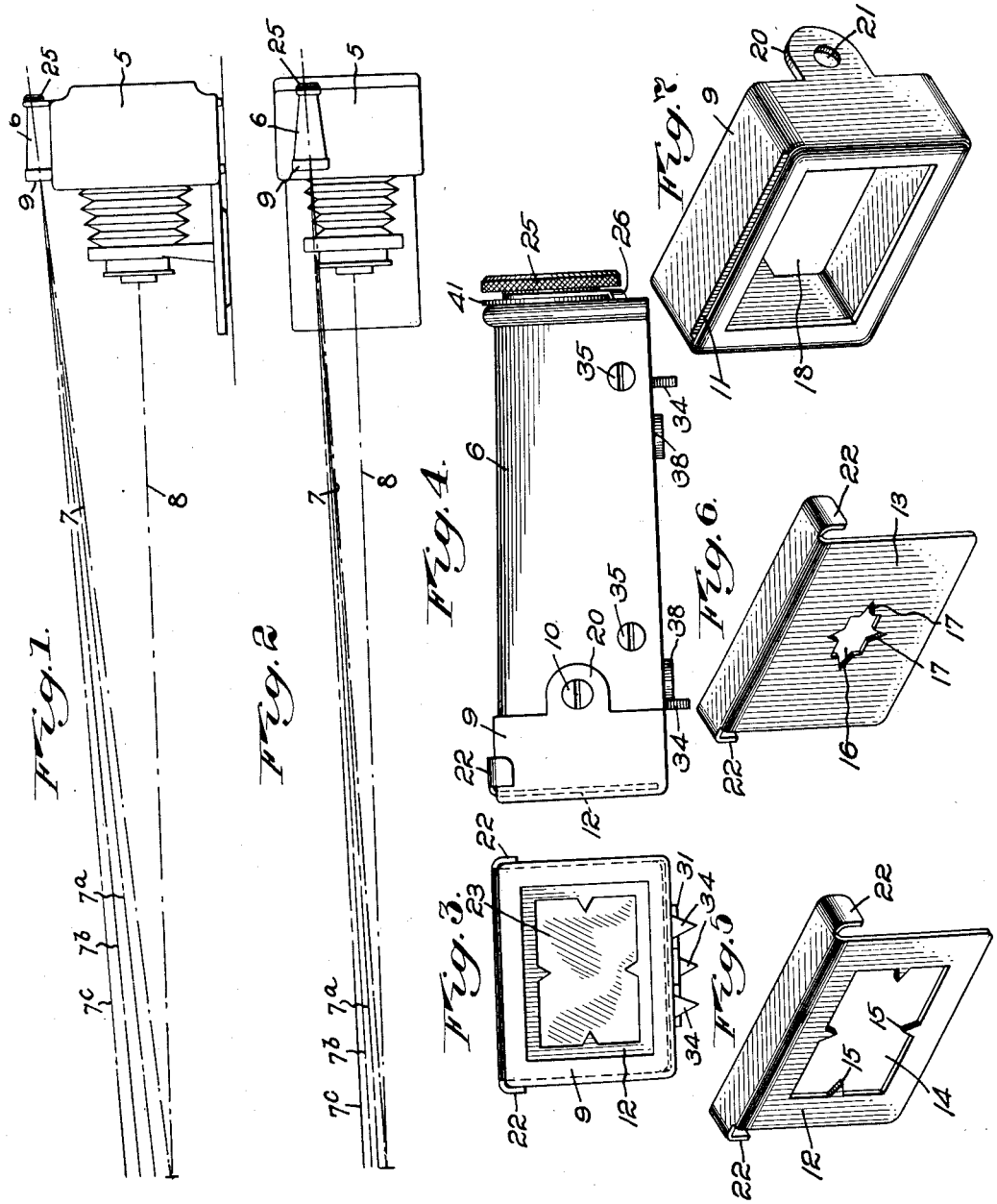
INVENTOR.
Earle W. De Bisschop
BY
his ATTORNEYS

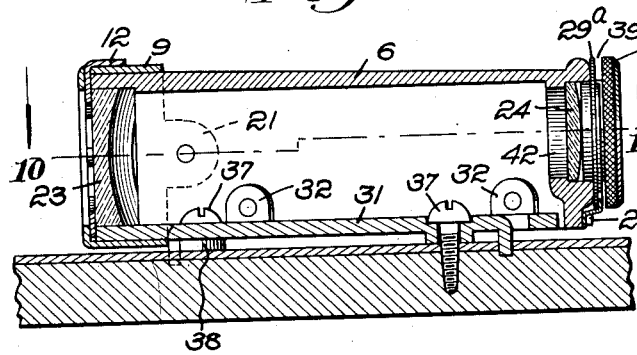
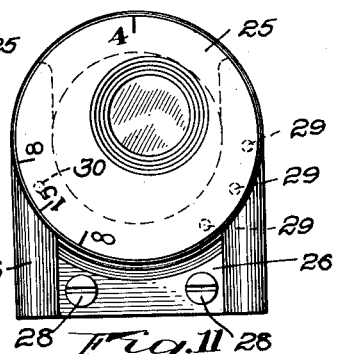
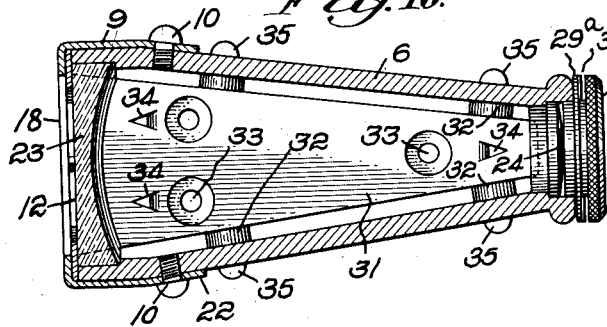
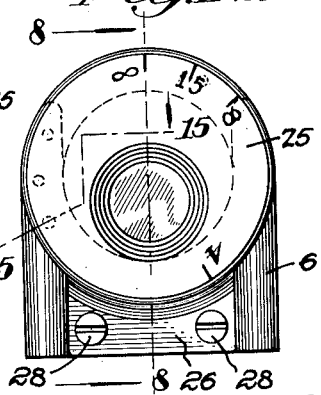
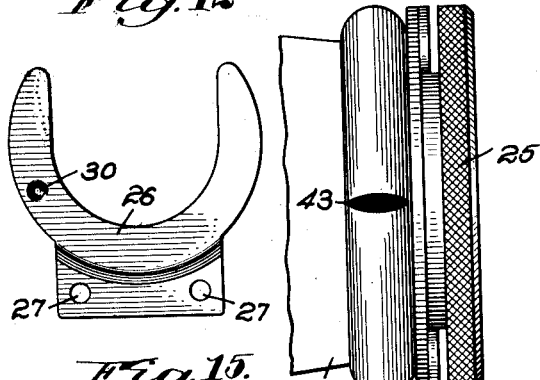
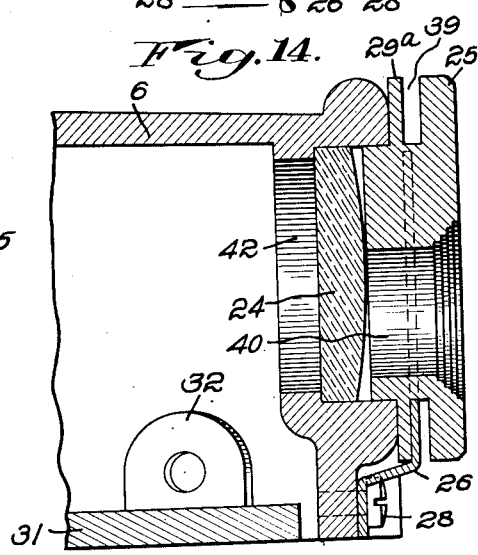
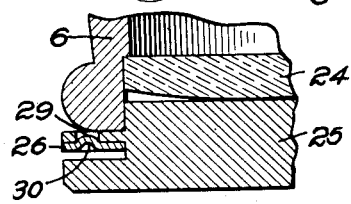

Patented Feb. 18, 1941

2,232,440

UNITED STATES PATENT OFFICE 2,232,440

VIEW FINDER ATTACHABLE TO PHOTOGRAPHIC CAMERAS

Earle W. De Bisschop, Rochester, N. Y., assignor to The Folmer Graflex Corporation, Rochester, N. Y., a corporation of Delaware Application July 11, 1939, Serial No. 283,741

10 Claims. (Cl. 88—1.5)

This invention relates to new, improved view finders readily attachable to photographic cameras for the purpose of correcting for parallax and for adjusting or defining the field of view with respect to lenses of different focal length.

In order that the principle of the invention may be readily understood, I have disclosed a single embodiment thereof in the accompanying drawings, wherein—

Fig. 1 is a side plan view of a camera with the view finder attached;

Fig. 2 is a top plan view showing the position of the view finder when mounted on the camera;

Fig. 3 is a front elevation of the view finder with one of the masks in place;

Fig. 4 is a side elevation of the view finder showing the relative positions of the several parts;

Fig. 5 is a perspective detail of one of the masks particularly adapted to lens of short focal length;

Fig. 6 is a perspective detail of one of the masks particularly adapted to lens of long focal length;

Fig. 7 is a perspective detail of the lens mounting cup;

Fig. 8 is a vertical, longitudinal section of Fig. 11 on the line 8—8 thereof, showing the construction of parts and the means for attaching the view finder to the photographic camera;

Fig. 9 is a rear elevation of the view finder showing the adjustable eye-piece in position for a four-foot setting;

Fig. 10 is a longitudinal, horizontal section of Fig. 8 on the line 10—10 thereof;

Fig. 11 is a rear elevation similar to Fig. 9 wherein the eye-piece is now set to the "infinity" position;

Fig. 12 is an end elevation of the eye-piece retaining yoke;

Fig. 13 is an enlarged detail in side elevation of the rear portion of the view finder showing the manner of attaching the eye-piece;

Fig. 14 is an enlarged partial vertical cross section, also on the line 8—8 of Fig. 11, showing the construction of eye-piece and eye-piece retaining yoke; and Fig. 15 is a detail in section of the eye piece, showing one of the index holes for indexing the eye-piece and the indentation of the yoke.

My invention is particularly applicable for use in connection with a photographic camera upon which the view finder is mounted. The view finder, if mounted on a camera, must in practice not only be mounted some distance away from the actual axis of the camera objective lens, but must also be displaced laterally with respect to a vertical plane passing through the axis of the said camera objective lens, as indicated in Fig. 2. While my invention is not limited to use with any particular camera, it is especially adapted for use with the so-called miniature Speed Graphic camera, in which a wire frame finder occupies a position that includes a vertical plane extending through the axis of the objective lens.

Therefore, under such conditions the object to be photographed will, as viewed through the view finder, be slightly displaced from the said object as viewed through the camera objective lens. Thus, the object photographed will not be exactly the same as that viewed through the view finder. I have by my invention provided improved simple means permitting the seeing of that portion of the object that is to be photographed through the camera objective lens, through the act of adjusting the angle of view through the view finder. This I have accomplished without any change in position of the view finder or of the lens or lenses therein. I achieve the desired result by providing an eye-piece at one side of and preferably back of the rearmost lens of the view finder, which eye-piece has a sight-hole that is off-center with respect to the center line of the eye piece, and therefore with respect to the adjacent lens. The said eye-piece is rotatable and by turning the same, as hereinafter more fully described, to predetermined positions, I provide for and effect the changing of the angle of view through the view finder, as, for example, with respect to objects to be photographed at estimated distances of four feet, eight feet, fifteen feet or distances beyond a hundred feet, in other words "infinity."

My invention also provides a simple means for restricting the view of the view finder to the area covered by the objective lens of the camera, this result being effected through the provision of a series of masks.

Without confining myself thereto I will proceed to describe the preferred form or embodiment of the invention, and in doing so I will first refer to the diagrammatic representations in Figs. 1 and 2.

In Figs. 1 and 2, a camera is indicated generally at 5. It may be of any suitable type, as, for example, a miniature Speed Graphic camera, and is shown as one having a bellows and a front upright which carries the objective lens and which front upright is movable to and fro along the bed of the camera in a manner which need not be more fully described. Other parts or accessories are omitted from Figs. 1 and 2, as, for example, the wire frame finder referred to.

The view finder body or housing is indicated generally at 6 in the several views, and particularly in Figs. 1, 2, 4, 8 and 10.

Referring to Figs. 1 and 2, I have indicated at 7, 7a, 7b, 7c a series of inclined dotted lines which are, according to the extent to which the eye-piece has been rotated, sighted through the view finder 6 to an object at predetermined distances, which in the present case are four feet, eight feet, fifteen feet and infinity or one hundred feet. The line 7 indicating four feet is shown as meeting a line 8 which represents the center line of the photographic or objective lens of the camera. The other inclined lines 7a, 7b, 7c, for the distances of eight feet, fifteen feet and infinity, are shown as broken off at the left before they meet the line 8 because of the limited space on the sheet.

I will set forth in detail hereinafter how the lines 7, 7a, 7b, 7c can be made to intersect line 8 at their proper respective distances from the camera 5.

The view finder body housing or casing 6 is provided with a lens retaining cap or cup 9 of general rectangular open form, which is held to the view finder body 6 by means of screws 10 at the sides of the view finder, one of said screws being shown in Fig. 4. The said retaining cup or cap 9 is provided with a transversely extending slot 11 into which masks 12, 13, etc., can be inserted as best indicated in Fig. 7. The mask 12 is provided with a relatively large opening 14 and centering points 15, 15, shown most clearly in Fig. 5. The mask 13 has a smaller opening 16 with centering cut-outs 17, 17, as shown in Fig. 6. Additional masks may be provided, if desired, so as to provide a set of more than two.

The retaining cup or cap 9 is provided with an opening at the front portion 18 behind which the said masks 12, 13 are inserted, as desired. The said retaining cup or cap is also provided with lateral ears 20 each having a hole 21 so that the cup or cap may be attached to the view finder case by said screws 10, 10. The masks 12, 13 are provided with turned-down portions 22, shown in Figs. 3, 4, 5 and 6, to serve as handles for inserting and removing the mask from the lens retaining cup or cap 9.

For simplicity and cheapness of construction, while at the same time providing a strong satisfactory view finder, I provide the body housing or casing thereof as a metal casting of general arch form in cross section, that is, with top and sides so as to be receivable over a structurally separate base piece that will be described.

The said view finder body housing or casing 6 is provided with a lens or lenses, and preferably with a negative lens 23 at the front thereof and a positive lens 24 at the rear end, both being fixed in position desirably by cementing them in place. It will be observed that the positive lens 24 is positioned so that a central axial line passing horizontally therethrough will pass above the axial center of the negative lens 23. This manner of mounting the two lenses partially, but only partially, compensates for the fact that the view finder is mounted at one side of and above the objective or taking lens. It will be noted that the arrangement of lenses is a simple reversed Galileon telescope.

Preferably behind the positive lens 24 (that is, between said lens and the operator) is attached an eye-piece cylinder or member 25 which is held in position by an eye-piece yoke 26, shown most clearly in Fig. 12. Said yoke is provided in its lower part or base with holes 27, 27, through which pass screws 28, 28 that are received in the body or housing or casing portion 6 of the view finder, whereby the eye-piece 25 is held to the body of the view finder. The said eye-piece 25 is provided with a series of holes 29, 29 circumferentially arranged at the proper point in the rearmost flange 29a. The yoke 26 is provided with an extruded portion, lobe, or formation 30 which is adapted to engage any one of the holes 29, 29, so as thereby to retain the eye-piece 25 in any one of the selected positions of circumferential adjustment hereinafter described. This construction is best shown in Figs. 9, 11, 14 and 15.

Referring more particularly to Figs. 8 and 10, the view finder, according to the preferred embodiment or example of my invention, is provided with a metal base piece or plate 31 having upturned bosses 32, 32, and holes 33, 33. The said base plate 31 is also provided with turned-down points 34, 34 for engaging the casing of the camera when fastened thereto. The upturned bosses 32, 32 receive screws 35, 35 that pass through the housing or casing or body portion of the view finder, thereby holding the said housing or casing or body portion 6 to the base plate 31. My invention is, of course, not limited to the making of the view finder with a base portion structurally separate from the overlying or body portion, but that is the preferred construction, having important structural advantages in manufacture.

It will be observed that a portion of the base plate 31, which is desirably of metal, is pushed downward so as to form bosses 38, 38, thus providing support for the base plate 31 when the same is attached to the casing of the camera 5.

As already stated, the lenses 23 and 24 are cemented into the body portion of the view finder. The lens 23 is additionally held in place by means of the retaining cup or cap 9 and the mask 12 or 13, as indicated most clearly in Figs. 8 and 10.

It is indicated clearly in Figs. 13 and 14 how the retaining yoke 26 engages a circumferential slot or groove 39 of the eye-piece 25, so as to hold the said eye-piece to the body or casing of the view finder 6.

As shown most clearly in Fig. 14 and as indicated in Figs. 9 and 11, the eye-piece 25 is provided with a sight-hole 40, and the housing or casing or body portion 6 of the view finder is provided with a clearance hole 42. The said sight-hole 40 is off-center or eccentric with respect to the center line of the eye-piece 25. Therefore, by turning the eye-piece 25 so that the formation 30 on the yoke 26 engages in a selected one of the holes 29, 29 of the flange 41 of the eye-piece 25, definite positions are thereby maintained for the sight-hole 40, as circumstances may require. This changes from time to time, as the eye-piece is turned, the line of sight through the lens 24 with respect to the center of lens 23, and this provides a change in the angle of view through the view finder 6.

Inasmuch as the view finder 6 is mounted to one side of and above the objective or taking lens of the camera, the image as viewed through the view finder will not be precisely the same as the image that appears on the ground glass or is made on the photographic material when a picture is taken unless correction be made for parallax. In the present construction the view finder is immovable and therefore cannot be swung to cause it to intersect an imaginary line through the center of the objective lens at a certain distance in front of the camera, which distance would be that between the objective lens and the object to be photographed.

In accordance with my invention, I change the line of view through the view finder without moving the view finder and without moving the lens or lenses thereof. This I accomplish by turning the eye-piece 25 that is provided with an off-center sight-hole. While conceivably and ideally the desired result might be accomplished by moving the sight-hole across the lens 24 in a straight line, mechanism to do this would be relatively complicated and costly. I have discovered that if the sight-hole in the eye-piece 25 is caused to swing about a central point which is the axial center of the positive lens 24, the said sight-hole then will for each of the selected distances have a position which is close to and near enough to the said center or axial line of the lens 24 for all practical purposes.

If it be assumed that a horizontal line be drawn transversely through the axis of the lens 23 and another line be similarly drawn through the centre of the lens 24, these two lines will be spaced apart a slight vertical distance, as will be evident from Fig. 8. A straight inclined line drawn from the bottom of the lens 24 upwardly and inclining approximately forty degrees to the right viewing Figs. 9 and 11, would include the ideal positions for the sight-hole 40 at its various settings. However, by properly distributing the retaining holes 29 about the flange 29a, the sight-hole 40 for the various selected distances, such as four feet, eight feet, fifteen feet, and one hundred feet or infinity may be positioned sufficiently close to the said imaginary inclined line for all practical purposes.

It will be evident that when the operator looks through the sight-hole 40 when in the position designated as infinity, the said sight-hole will be on a vertical line extending through the centre of the lens 24, as indicated in Fig. 11.

Thus the line 7 would never actually intersect the line 8 of Figs. 1 and 2. However, the view finder 6 is actually mounted on the camera 5 so as to compensate for this distance (that is, to cause the line 7 to meet the line 8 at the infinity position). This compensation is taken into consideration in all the settings, such as four feet, eight feet, and fifteen feet.

Inasmuch as the center of the positive lens 24 is above the center of the negative lens 23, some compensation is provided in this manner which, however, is for a distance slightly less than eight feet. Thus the sight-hole position for the distances of eight feet and infinity will be below the center line passing horizontally through the center of the lens 24 and for a distance of four feet the position of the sight-hole 40 will be above the said horizontal center line that passes through the center of the positive lens 24.

I am aware that in the prior art there are disclosures of lenses which are moved around a central point for various purposes, but in the present invention there are provided fixed lenses and a rotatable or turnable eye-piece having an off-center sight-hole. Such construction permits the making of a very compact view finder and one which can be manufactured at lower cost. Moreover it permits the use of a larger lens which lends to lower cost and the mounting of the lens itself is much more simple.

It will be observed that the eye-piece 25 is provided with graduations shown in Figs. 9 and 11 and marked as 4, 8, 15 and with the infinity sign. These marks or graduations are placed at the proper points as already explained. For each of the said graduations or marks on the eye-piece 25 a hole 29 is provided in the flange 29a of the eye-piece 25. Therefore, the eye-piece 25 can be set in any one of the said positions and thereby correction is made of the angle of view through the view finder for any of the said distances, namely, four feet, eight feet, fifteen feet and infinity or distances beyond a hundred feet.

As shown in Fig. 13, I have provided an index mark 43 upon the extreme rear end of the body portion 6 of the view finder just in front of the eye piece 25. This is for the purpose of accurately setting the eye-piece for any one of the selected distances.

It is important in a view finder of the type herein disclosed to provide means that restricts the view or field of the view finder to the exact area covered by the objective lens of the camera. This result I have accomplished through the provision of a series of masks such as 12, 13, etc. Therefore, a relatively short focal length lens may be employed, in which case the mask 12 with the relatively large opening as indicated in Fig. 5 would be used. If a lens of relatively long focal length is used, a mask with a rather small opening, such as indicated in Fig. 6, would be chosen instead. I may provide any number of masks in excess of two, each having a definite and proper sized opening to suit some one of the various objective lenses that it may be desired to use with the camera. The points 15, 15 on the mask 12 and the cut-out portions 17 on the mask 13 are for the purpose of more accurately centering the object to be photographed.

My invention provides a view finder that is compact and substantial and is readily adjustable for any number of different uses to which a view finder is put. It affords great depth of focus and clarity of vision, and clearly defines the field that will be recorded on the negative, permitting adjustment for parallax. The structure is nevertheless very simple and easy to manufacture. I have by my invention provided a view finder having means by which it may be accurately determined just what will be included in the photograph, by viewing the object through the view finder.

Having thus described one illustrative embodiment of the invention, it is to be understood that although specific terms are employed, they are used in a generic and descriptive sense, and not for purposes of limitation, the scope of the invention being set forth in the following claims.

I claim:

1. A view finder assembly, particularly adapted for attachment to and use with photographic cameras themselves adapted to use objective lenses of different focal lengths, said assembly including a structurally separate base piece having means for attaching the same directly to an outer wall of the camera, a unitary member consisting of top and sides receivable over said base piece, means for securing said base piece and unitary member together in position upon such wall of the camera, a mask holder having means for attaching the same about the forward end of the positioned base piece and unitary member, a negative lens and a positive lens mounted in said housing or casing at respectively the forward and rear ends thereof, a circumferentially adjustable eye-piece mounted outside said positive lens and having a sight-hole off-center with respect to the center line of the eye-piece, a yoke attached to said housing or casing to aid in supporting said eye-piece and in which the eye-piece is directly received at its peripheral portion, and interengaging formations upon said yoke and said eye-piece for holding the latter in any predetermined position of circumferential adjustment in said yoke.

2. A unitary view-finder assembly adaptable to objective camera lenses of different focal length and adapted to be rigidly secured to the camera casing at one side of and above the axis of the objective lens thereof and so as to be devoid of bodily movement and correcting for parallax, comprising a single tube-like receptacle securable to the top of the camera casing, viewing lenses respectively fixed in position in the forward and rear ends of said receptacle, a cap fitted over the forward end of said receptacle and having a slot-like opening for the introduction of a disk-like mask appropriate to the focal length of the objective lens of the camera, said cap serving also, because of said position over the forward end of said receptacle, to assist in holding the forward viewing lens in place therein, and an eye-piece mounted upon said receptacle outside of said rear viewing lens, for circumferential turning movement, and having a relatively large off-center sight-hole therein.

3. A unitary view-finder assembly adaptable to objective camera lenses of different focal length and adapted to be rigidly secured to the camera casing at one side of and above the axis of the objective lens thereof and so as to be devoid of bodily movement and correcting for parallax, comprising a receptacle consisting of a base, sides and top, said receptacle being rigidly securable directly to the top of the camera casing at one side of the objective lens thereof, viewing lenses respectively fixed in position in the forward and rear ends of said receptacle, and an eye-piece having a circular periphery, which periphery is directly received upon the end of said receptacle outside of and substantially directly against the said viewing lens thereof for circumferential turning movement, and having an off-center sight-hole therein which has a diameter of substantially one half the diameter of the said rear viewing lens.

4. A unitary view-finder assembly adaptable to objective camera lenses of different focal length and adapted to be rigidly secured to the camera casing at one side of and above the axis of the objective lens thereof and so as to be devoid of bodily movement and correcting for parallax, comprising a receptacle consisting of a base, sides and top, said receptacle being rigidly securable directly to the top of the camera casing at one side of the objective lens thereof, viewing lenses respectively fixed in position in the forward and rear ends of said receptacle, said receptacle at its rear end having a yoke attached thereto close to said rear viewing lens, and an eye-piece having a circular periphery, which periphery is directly received in said yoke at the outside of and substantially directly against the said rear viewing lens, so as to be rotatable in said yoke, said eye-piece having a relatively large off-center sight-hole therein.

5. A unitary view-finder assembly adaptable to objective camera lenses of different focal length and adapted to be rigidly secured to the camera casing at one side of and above the axis of the objective lens thereof and so as to be devoid of bodily movement and correcting for parallax, comprising a base member securable directly and rigidly to the top of the camera casing at one side of the objective lens thereof, an integral sides-and-top member secured directly to the said base member so as to complete therewith a tube-like receptacle, viewing lenses respectively fixed in position in the forward and rear ends of said receptacle, the said rear viewing lens being mounted with its central axis above the axis of the said forward viewing lens, and eye-piece having a circular periphery, which periphery is directly received for rotatable movement upon the rear end of said receptacle in close proximity to said rear viewing lens, said eye-piece having an off-center sight-hole therein which approximates in diameter one half the diameter of said rear viewing lens, and a cap fitted about the forward end of said receptacle and assisting, because of its said position, in holding the forward viewing lens in place, said cap having a slot-like opening for the insertion at one face of the forward viewing lens of a disk-like mask appropriate to the focal length of the objective lens of the camera.

6. As a separate article of manufacture and sale, a view finder structurally distinct from and adapted to be readily secured by holding means upon an outside wall of the casing of a photographic camera, and comprising a base plate adapted to be applied and secured flatwise to an outside wall of the camera casing, a cooperating part which, with the base plate, constitutes the body or housing, said base and cooperating part providing the base, sides and top of an elongated chamber, means for securing said housing to the camera wall, a lens fixed in the forward end of said housing, a lens fixed in the rear end of said housing, the axis of said rear lens being above that of said forward lens, a supporting yoke piece 26 secured to the rear end of said housing, an eye-piece 25 having a circular periphery, which periphery is turnably mounted in said yoke piece, in close proximity to the rear lens, said eye-piece having a large sight-hole 40 off-center with respect to the axial line of said rear lens.

7. As a separate article of manufacture and sale, a view finder structurally distinct from and adapted to be readily secured by holding means upon an outside wall of the casing of a photographic camera, and comprising a base plate adapted to be applied and secured flatwise to an outside wall of the camera casing, a cooperating part which, with the base plate, constitutes the body or housing, said base and cooperating part providing the base, sides and top of an elongated chamber, means for securing said housing to the camera wall, a lens fixed in the forward end of said housing, a lens fixed in the rear end of said housing, the axis of said rear lens being above that of said forward lens, a supporting yoke-piece 26 secured to the rear end of said housing, a eye-piece 25 having a circular periphery, which periphery is turnable in said yoke piece in close proximity to said lens and having a large sight-hole 40 off-center with respect to the axis of said lens 24, said yoke-piece having a holding formation 30 and the eye piece 25 having in its margin a series of spaced holes 29 to be engaged by said formation 30.

8. A unitary view-finder assembly adaptable to objective camera lenses of different focal length and adapted to be rigidly secured to the camera casing at one side of and above the axis of the objective lens thereof and so as to be devoid of bodily movement and correcting for parallax, comprising a receptacle rigidly securable to the top of the camera casing at one side of the objective lens thereof, viewing lenses respectively fixed in position in the forward and rear ends of said receptacle, the rear end of said receptacle having secured thereto an eye-piece supporting means shaped to engage such eye-piece only at the periphery thereof, so as to leave the faces of the eye-piece unobstructed, and an eye-piece having a circular periphery, which periphery is received and rotatably supported by said supporting means substantially against the face of the said rear lens, said eye-piece having an off-center sight-hole therein approximating in diameter one half the diameter of said lens.

9. A unitary view-finder assembly adapted to objective camera lenses of different focal length and adapted to be rigidly secured to the camera casing at one side of and above the axis of the objective lens thereof and so as to be devoid of bodily movement and correcting for parallax, comprising a receptacle rigidly securable to the top of the camera casing at one side of the objective lens thereof, viewing lenses respectively fixed in position in the forward and rear ends of said receptacle, the rear end of said receptacle having secured thereto an eye-piece supporting means shaped to engage such eye-piece only at the periphery thereof, so as to leave the faces of the eye-piece unobstructed, and an eye-piece received and rotatably supported at its periphery by said supporting means substantially against the face of the said rear lens, said eye-piece having an off-center sight-hole therein approximating in diameter one half the diameter of said lens, said supporting means and said eye-piece having one a holding formation and the other a circumferentially spaced series of cooperating holding formations, whereby the eye-piece may be retained in any one of the selected positions of its circumferential adjustment in said supporting means upon interengagement of the respective formations.

10. In a view finder adapted to be secured to the casing of a photographic camera, a body or housing therefor having lenses respectively positioned in the front and rear ends thereof, an eye-supporting yoke piece at the rear end of said housing, and an eye-piece having a circular periphery, which periphery is turnably mounted in said yoke piece in proximity to the said rear lens, said eye-piece having a large sight-hole off-center with respect to the axial line of said rear lens.

EARLE W. DE BISSCHOP.